US009779279B2

(12) United States Patent
Huang et al.

(10) Patent No.: US 9,779,279 B2
(45) Date of Patent: Oct. 3, 2017

(54) FINGERPRINT RECOGNITION METHOD, FINGERPRINT RECOGNITION DEVICE AND ELECTRONIC DEVICE (71) Applicants: BOE TECHNOLOGY GROUP CO., LTD., Beijing (CN); CHENGDU BOE OPTOELECTRONICS TECHNOLOGY CO., LTD., Chengdu (CN)

(72) Inventors: Weiyun Huang, Beijing (CN); Zhidong Wang, Beijing (CN); Tingliang Liu, Beijing (CN)

(73) Assignees: BOE TECHNOLOGY GROUP CO., LTD., Beijing (CN); CHENGDU BOE OPTOELECTRONICS TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 15/109,324

(22) PCT Filed: Jan. 27, 2016

(86) PCT No.: PCT/CN2016/072333
§ 371 (c)(1),
(2) Date: Jun. 30, 2016

(87) PCT Pub. No.: WO2017/045331
PCT Pub. Date: Mar. 23, 2017

(65) Prior Publication Data
US 2017/0228571 A1 Aug. 10, 2017

(30) Foreign Application Priority Data

Sep. 15, 2015 (CN) .......................... 2015 1 0587522

(51) Int. Cl.
*G06K 9/00* (2006.01)

(52) U.S. Cl.
CPC ................................. *G06K 9/0002* (2013.01)

(58) Field of Classification Search
None
See application file for complete search history.

(56) References Cited

U.S. PATENT DOCUMENTS 9,704,011 B2 * 7/2017 Yang .................... G06K 9/0002
2004/0062426 A1 4/2004 Lo
(Continued)

FOREIGN PATENT DOCUMENTS

CN    103530609 A    1/2014
CN    103745194 A    4/2014
(Continued)

OTHER PUBLICATIONS

International Search Report and Written Opinion of the International Searching Authority for International Application No. PCT/CN2016/072333, dated Apr. 27, 2016. Translation provided by Dragon Intellectual Property Law Firm.

*Primary Examiner* — Delomia L Gilliard
(74) *Attorney, Agent, or Firm* — Harness, Dickey & Pierce, P.L.C.

(57) ABSTRACT

The present disclosure relates to a fingerprint recognition method, a fingerprint recognition device and an electronic device, wherein the fingerprint recognition method comprises: an obtaining step of obtaining a capacitance detection value corresponding to each sensing electrode in a sensing electrode array; a calculation step of calculating a difference value between a first capacitance detection value corresponding to a first sensing electrode and a second capacitance detection value corresponding to a second sensing electrode, wherein the first sensing electrode and the second sensing electrode are adjacent to each other in the sensing electrode array; a type determination step of determining a fingerprint type detection result of the first sensing electrode (Continued)

and a fingerprint type detection result of the second sensing electrode according to the difference value; and a recognition step of recognizing the fingerprint according to the fingerprint type detection results.

20 Claims, 5 Drawing Sheets

(56) References Cited

U.S. PATENT DOCUMENTS

| | | | | |
|---|---|---|---|---|
| 2007/0160263 | A1* | 7/2007 | Abiko | G06K 9/00919 382/115 |
| 2016/0042215 | A1 | 2/2016 | Wang et al. | |
| 2016/0042216 | A1* | 2/2016 | Yang | G06K 9/0002 382/124 |
| 2016/0292488 | A1 | 10/2016 | Ran et al. | |
| 2017/0046551 | A1* | 2/2017 | Lee | G06K 9/0002 |

FOREIGN PATENT DOCUMENTS

| | | |
|---|---|---|
| CN | 104636650 A | 5/2015 |
| CN | 104881196 A | 9/2015 |
| CN | 105094494 A | 11/2015 |
| KR | 100293899 B1 | 4/2001 |

\* cited by examiner

FINGERPRINT RECOGNITION METHOD, FINGERPRINT RECOGNITION DEVICE AND ELECTRONIC DEVICE

CROSS-REFERENCE TO RELATED APPLICATIONS

This application is the U.S. national phase of PCT Application No. PCT/CN2016/072333 filed on Jan. 27, 2016, which claims a priority to Chinese Patent Application No. 201510587522.0 filed in China on Sep. 15, 2015, which is incorporated herein by reference in its entirety.

TECHNICAL FIELD

The present disclosure relates to the field of the fingerprint recognition, in particular to a fingerprint recognition method, a fingerprint recognition device and an electronic device that are of high recognition accuracy.

BACKGROUND

The so-called fingerprint recognition refers to performing recognition by means of the fingerprint information unique to a person's finger. There are two common fingerprint recognition methods, i.e. a capacitance fingerprint recognition method and an optical fingerprint recognition method.

In the related arts, during the capacitance fingerprint recognition: a capacitance measurement value corresponding to a sensing electrode is compared with a type determination threshold; when the capacitance measurement value is greater than or equal to the threshold, it is determined that a fingerprint recognition result corresponding to the sensing electrode is a first type (it may be a fingerprint ridge or a fingerprint valley according to a structure of the capacitor), whereas when the capacitance measurement value is smaller than the threshold, it is determined that the fingerprint recognition result corresponding to the sensing electrode is a second type that is opposite to the first type.

In such fingerprint recognition method, the capacitance detection value corresponding to the sensing electrode that corresponds to the fingerprint valley is very close to the capacitance detection value corresponding to the sensing electrode that corresponds to the fingerprint ridge. That is, an average capacitance detection value corresponding to the sensing electrode that corresponds to the fingerprint valley is A, whereas an average capacitance detection value corresponding to the sensing electrode that corresponds to the fingerprint ridge is A is $A+\Delta$ ($\Delta$ is a very small value). In the fingerprint recognition method based on an absolute capacitance measurement value in the related arts, the above threshold generally is $A+\Delta/2$.

Once the measurement deviation is affected by factors such as the environment to some extent, a fingerprint type recognition error may occur in the above-mentioned fingerprint recognition method.

For example, it is assumed that, when the sensing electrode corresponds to the fingerprint valley, an actual capacitance value of a capacitor corresponding to the sensing electrode is $A+\Delta/4$, and a measurement deviation is $\Delta/3$. As a result, when the sensing electrode corresponds to the fingerprint valley, the capacitance detection value corresponding to the sensing electrode is $A+\Delta/4+\Delta/3=A+7\Delta/12$. Thus, in the above fingerprint recognition criteria, since the capacitance detection value ($A+7\Delta/12$) corresponding to the sensing electrode is greater than the type determination threshold ($A+\Delta/2$), it is determined that the fingerprint recognition result is the fingerprint ridge, and thereby a fingerprint type recognition error occurs.

SUMMARY

An object of the present disclosure is to provide a fingerprint recognition method, a fingerprint recognition device and an electronic device that are of the high recognition accuracy.

In one aspect, the present disclosure provides in some embodiments a method for recognizing a fingerprint, comprising: an obtaining step of obtaining a capacitance detection value corresponding to each sensing electrode in a sensing electrode array; a calculation step of calculating a difference value between a first capacitance detection value corresponding to a first sensing electrode and a second capacitance detection value corresponding to a second sensing electrode, wherein the first sensing electrode and the second sensing electrode are adjacent to each other in the sensing electrode array; a type determination step of determining a fingerprint type detection result of the first sensing electrode and a fingerprint type detection result of the second sensing electrode according to the difference value; and a recognition step of recognizing the fingerprint according to the fingerprint type detection results.

In the above method, sensing electrodes in the sensing electrode array are arranged on a same plane; and the obtaining step comprises a step of: obtaining a capacitance detection value corresponding to a capacitor corresponding to each sensing electrode, wherein a first plate of the capacitor is formed by a sensing electrode currently to be detected in the sensing electrode array, and a second plate of the capacitor is formed by at least one sensing electrode adjacent to the sensing electrode currently to be detected in the sensing electrode array.

In the above method, the obtaining step includes: a transmission step of transmitting an excitation signal to the first plate; a collection step of collecting a first electrical signal from the second plate during the transmission of the excitation signal; and a calculation step of calculating the capacitance detection value of the capacitor according to the first electrical signal.

In the above method, the type determination step comprises steps of: determining that the fingerprint type detection result corresponding to the first sensing electrode is same as the fingerprint type detection result corresponding to the second sensing electrode in the case that an absolute value of the difference value is smaller than or equal to a capacitance difference threshold; determining that the fingerprint type detection result corresponding to the first sensing electrode is a fingerprint valley and the fingerprint type detection result corresponding to the second sensing electrode is a fingerprint ridge in the case that the absolute value of the difference value is greater than the capacitance difference threshold and the first capacitance detection value is greater than the second capacitance detection value; and determining that the fingerprint type detection result corresponding to the first sensing electrode is the fingerprint ridge and the fingerprint type detection result corresponding to the second sensing electrode is the fingerprint valley in the case that the absolute value of the difference value is greater than the capacitance difference threshold and the first capacitance detection value is smaller than the second capacitance detection value.

In the above method, the obtaining step includes: a transmission step of transmitting an excitation signal and a ground signal to the first plate and the second plate respectively; a collection step of collecting a second electrical signal from the first plate during the transmission of the signals; and a calculation step of calculating the capacitance detection value of the capacitor according to the second electrical signal.

In the above method, the type determination step comprises steps of: determining that the fingerprint type detection result corresponding to the first sensing electrode is same as the fingerprint type detection result corresponding to the second sensing electrode in the case that an absolute value of the difference value is smaller than or equal to a capacitance difference threshold; determining that the fingerprint type detection result corresponding to the first sensing electrode is a fingerprint ridge and the fingerprint type detection result corresponding to the second sensing electrode is a fingerprint valley in the case that the absolute value of the difference value is greater than the capacitance difference threshold and the first capacitance detection value is greater than the second capacitance detection value; and determining that the fingerprint type detection result corresponding to the first sensing electrode is the fingerprint valley and the fingerprint type detection result corresponding to the second sensing electrode is the fingerprint ridge in the case that the absolute value of the difference value is greater than the capacitance difference threshold and the first capacitance detection value is smaller than the second capacitance detection value.

In the above method, the second plate is formed by all of the sensing electrodes adjacent to the sensing electrode currently to be detected in the sensing electrode array.

In the above method, a type of the capacitor corresponding to the sensing electrode is a mutual-capacitance capacitor or a self-capacitance capacitor.

In another aspect, the present disclosure provides in some embodiments a fingerprint recognition device including: an obtaining module for obtaining a capacitance detection value corresponding to each sensing electrode in a sensing electrode array; a calculation module configured for calculating a difference value between a first capacitance detection value corresponding to a first sensing electrode and a second capacitance detection value corresponding to a second sensing electrode, wherein the first sensing electrode and the second sensing electrode are adjacent to each other in the sensing electrode array; a type determination module configured for determining a fingerprint type detection result of the first sensing electrode and a fingerprint type detection result of the second sensing electrode according to the difference value; and a recognition module configured for recognizing the fingerprint according to the fingerprint type detection results.

In the above fingerprint recognition device, the obtaining module is further configured for obtaining a capacitance detection value corresponding to a capacitor corresponding to each sensing electrode, wherein a first plate of the capacitor is formed by a sensing electrode currently to be detected in the sensing electrode array, and a second plate of the capacitor is formed by at least one sensing electrode adjacent to the sensing electrode currently to be detected in the sensing electrode array.

In the above fingerprint recognition device, the obtaining module comprises: a transmission unit configured for transmitting an excitation signal to the first plate; a collection unit configured for collecting a first electrical signal from the second plate during the transmission of the excitation signal; and a calculation unit configured for calculating the capacitance detection value of the capacitor according to the first electrical signal.

In the above fingerprint recognition device, the type determination module is further configured for: determining that the fingerprint type detection result corresponding to the first sensing electrode is same as the fingerprint type detection result corresponding to the second sensing electrode in the case that an absolute value of the difference value is smaller than or equal to a capacitance difference threshold; determining that the fingerprint type detection result corresponding to the first sensing electrode is a fingerprint valley and the fingerprint type detection result corresponding to the second sensing electrode is a fingerprint ridge in the case that the absolute value of the difference value is greater than the capacitance difference threshold and the first capacitance detection value is greater than the second capacitance detection value; and determining that the fingerprint type detection result corresponding to the first sensing electrode is the fingerprint ridge and the fingerprint type detection result corresponding to the second sensing electrode is the fingerprint valley in the case that the absolute value of the difference value is greater than the capacitance difference threshold and the first capacitance detection value is smaller than the second capacitance detection value.

In the above fingerprint recognition device, the obtaining module includes: a transmission unit configured for transmitting an excitation signal and a ground signal to the first plate and the second plate respectively; a collection unit configured for collecting a second electrical signal from the first plate during the transmission of the signals; and a calculation unit configured for calculating the capacitance detection value of the capacitor according to the second electrical signal.

In the above fingerprint recognition device, the type determination module is further configured for: determining that the fingerprint type detection result corresponding to the first sensing electrode is same as the fingerprint type detection result corresponding to the second sensing electrode in the case that an absolute value of the difference value is smaller than or equal to a capacitance difference threshold; determining that the fingerprint type detection result corresponding to the first sensing electrode is a fingerprint ridge and the fingerprint type detection result corresponding to the second sensing electrode is a fingerprint valley in the case that the absolute value of the difference value is greater than the capacitance difference threshold and the first capacitance detection value is greater than the second capacitance detection value; and determining that the fingerprint type detection result corresponding to the first sensing electrode is the fingerprint valley and the fingerprint type detection result corresponding to the second sensing electrode is the fingerprint ridge in the case that the absolute value of the difference value is greater than the capacitance difference threshold and the first capacitance detection value is smaller than the second capacitance detection value.

In the above fingerprint recognition device, the second plate is formed by all of the sensing electrodes adjacent to the sensing electrode currently to be detected in the sensing electrode array.

In the above fingerprint recognition device, a type of the capacitor corresponding to the sensing electrode is a mutual-capacitance capacitor or a self-capacitance capacitor.

In yet another aspect, the present disclosure provides in some embodiments an electronic device including the above fingerprint recognition device.

The embodiments of the present disclosure may have at least one of the following beneficial effects.

Due to a fact that the measurement deviation affects each of the adjacent sensing electrodes in a same manner, the fingerprint type recognition corresponding to the adjacent sensing electrodes may be performed based on capacitance detection difference value of the adjacent sensing electrodes. As a result, an influence of the measurement deviation on the fingerprint type recognition is reduced, and an accuracy of the fingerprint recognition is improved.

In the case of sensing electrodes being arranged in an array at a same layer, the capacitor is formed based on the sensing electrode and the adjacent sensing electrode, which reduces the influence of an external electric field on the capacitance detection value and improves the accuracy of the fingerprint type recognition.

BRIEF DESCRIPTION OF THE DRAWINGS

In order to illustrate the technical solutions of the present disclosure or the related art in a clearer manner, the drawings desired for the embodiments will be described briefly hereinafter. Obviously, the following drawings merely relate to some embodiments of the present disclosure, and based on these drawings, a person skilled in the art may obtain the other drawings without any creative effort.

DETAILED DESCRIPTION

In order to make the objects, the technical solutions and the advantages of the present disclosure more apparent, some technical solutions of the present disclosure will be described hereinafter in a clear and complete manner in conjunction with the drawings and embodiments. Obviously, the following embodiments are merely a part of, rather than all of, the embodiments of the present disclosure, and based on these embodiments, a person skilled in the art may obtain the other embodiments, which also fall within the scope of the present disclosure.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "a" are merely used to represent the existence of at least one member, rather than to limit the number thereof. Such words as "connect" or "connected to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

In the fingerprint recognition method, the fingerprint recognition device and the electronic device of some embodiments of the present disclosure, due to a fact that the measurement deviation affects each of the adjacent sensing electrodes in a same manner, the fingerprint type recognition corresponding to the adjacent sensing electrodes may be performed based on capacitance detection difference value of the adjacent sensing electrodes. As a result, an influence of the measurement deviation on the fingerprint type recognition is reduced, and an accuracy of the fingerprint recognition is improved.

The current capacitance fingerprint recognition uses a fingerprint sensor utilizing the technique of the capacitance sensor. This fingerprint sensor includes a detection panel formed by multiple small detection units.

Figure 1A:
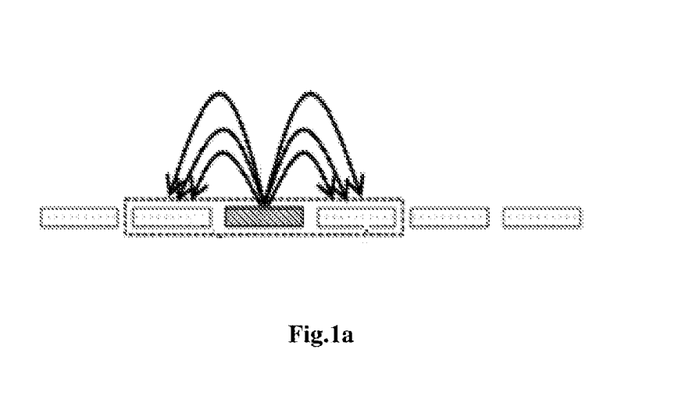
FIG. 1a is a schematic view showing an original electric field E formed between a transmitting electrode TX and a receiving electrode RX when a fingerprint is away from a detection panel in some embodiments of the present disclosure.

The mutual capacitance is taken as an example. When the fingerprint is away from the detection panel, an original electric field E shown in FIG. 1a is formed between the adjacent sensing electrodes that respectively serve as a transmitting electrode TX and a receiving electrode RE.

Figure 1B:
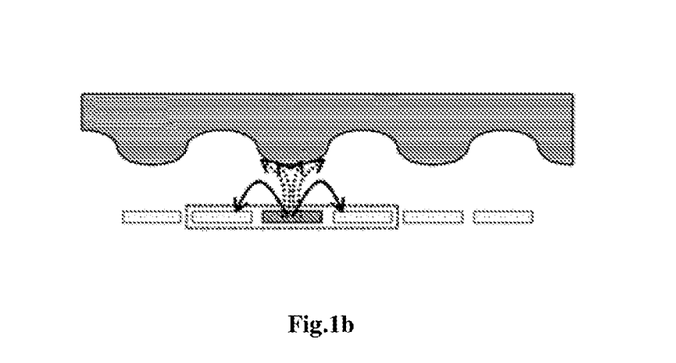
FIG. 1b is a schematic view showing an influence of a fingerprint ridge portion on the original electric field E generated between the transmitting electrode TX and the receiving electrode RX during a process of fingerprint detection in some embodiments of the present disclosure.

When the fingerprint recognition is performed, as shown in FIG. 1b, at least a part of the original electric field E is absorbed by the fingerprint. Therefore, during a process of fingerprint detection, the electric field between the transmitting electrode TX and the receiving electrode RX that correspond to the fingerprint ridge is changed into a first electric field E1, and the capacitance value of the capacitor correspondingly formed by the transmitting electrode TX and the receiving electrode RX is changed into C1.

Figure 1C:
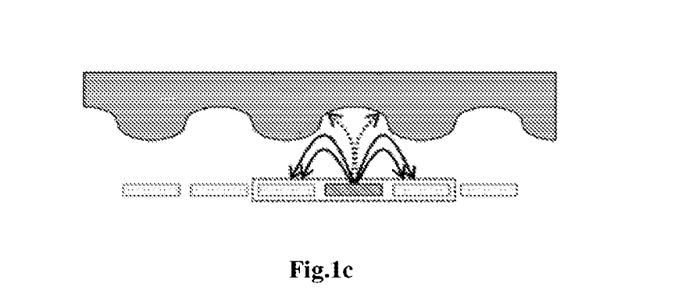
FIG. 1c is a schematic view showing an influence of a fingerprint valley portion on the original electric field E generated between the transmitting electrode TX and the receiving electrode RX during a process of fingerprint detection in some embodiments of the present disclosure.

When the fingerprint valley approaches the transmitting electrode TX, at least a part of the original electric field E also is absorbed by the fingerprint, and the electric field between the transmitting electrode TX and the receiving electrode RX that correspond to the fingerprint valley is changed into a second electric field E2. However, as shown in FIG. 1c, since there is a small gap between the fingerprint valley and the detection panel, the part absorbed from the original electric field E is relatively small, i.e. an electric field intensity of the second electric field E2 is greater than that of the E1, and the capacitance value of the capacitor correspondingly formed by the transmitting electrode TX and the receiving electrode RX is changed into C2.

Figure 2:
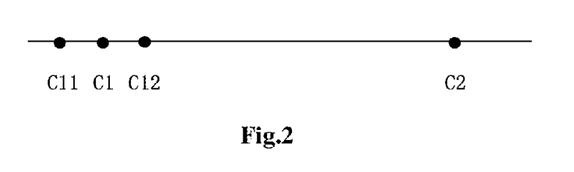
FIG. 2 is a schematic view showing a case about a capacitance detection value corresponding to a sensing electrode when the fingerprint types corresponding to adjacent sensing electrodes are the same in some embodiments of the present disclosure.
Figure 3:
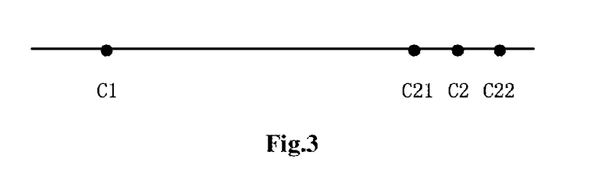
FIG. 3 is a schematic view showing another case about a capacitance detection value corresponding to the sensing electrode when the fingerprint types corresponding to adjacent sensing electrodes are the same in some embodiments of the present disclosure.

Therefore, when all of the adjacent sensing electrodes correspond to the fingerprint ridge, as shown in FIG. 2, the capacitance detection values C11 and C12 of the adjacent sensing electrodes approach C1. However, when the adjacent sensing electrodes all correspond to the fingerprint valley, as shown in FIG. 3, the capacitance detection values C21 and C22 of the adjacent sensing electrodes approach C2. In addition, when the adjacent sensing electrodes respectively correspond to the fingerprint ridge and the fingerprint valley, as shown in FIG. 4, the capacitance detection value C31 of the sensing electrode corresponding to the fingerprint valley approaches C1, and the capacitance detection value C32 of the sensing electrode corresponding to the fingerprint valley approaches C2.

Figure 4:
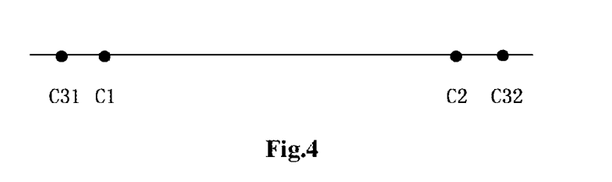
FIG. 4 is a schematic view showing a case about a capacitance detection value corresponding to the sensing electrode when the fingerprint types corresponding to adjacent sensing electrodes are different in some embodiments of the present disclosure.

Referring to FIGS. 2-4, it is found out that when the fingerprint types corresponding to the adjacent sensing electrodes are same, a difference between the capacitance detection values corresponding to them is relatively small (shown in FIGS. 2 and 3), and when the fingerprint types corresponding to the adjacent sensing electrodes are different, the difference between the capacitance detection values corresponding to them is relatively large (shown in FIG. 4).

In contrast, when the difference between the capacitance detection values corresponding to the adjacent sensing electrodes is relatively small, it can be determined that the fingerprint type detection results corresponding to the adjacent sensing electrodes are the same, and when the difference between the capacitance detection values corresponding to the adjacent sensing electrodes is relatively large, it can be determined that the fingerprint type detection results corresponding to the adjacent sensing electrodes are different.

When the difference between the capacitance detection values corresponding to the adjacent sensing electrodes is relatively large, it also can be determined which sensing electrode's corresponding fingerprint type is a fingerprint valley and which sensing electrode's corresponding fingerprint type is a fingerprint ridge according to a size of the capacitance detection value corresponding to the adjacent sensing electrode and the types of the capacitor, which will be explained hereinafter in details.

Based on the above explanation, the followings have been found out:

1. it can be determined whether the fingerprint type detection results corresponding to the adjacent sensing electrodes are the same according to the difference between the capacitance detection values corresponding to the adjacent sensing electrodes;

2. when it is determined that the fingerprint type detection results corresponding to the adjacent sensing electrodes are different according to the difference between the capacitance detection values corresponding to the adjacent sensing electrodes, the fingerprint type detection result of each sensing electrode in the adjacent sensing electrodes can be determined according to the types of the capacitor corresponding to the sensing electrode and the size of the capacitance detection value corresponding to the adjacent sensing electrodes.

For a capacitor of a self-capacitance, the above-mentioned rule is also applicable, so no further detailed explanation is given herein.

Therefore, in the method of some embodiments of the present disclosure, it can determine the fingerprint type detection results of all of the sensing electrodes based on the difference of the capacitance detection value corresponding to the adjacent sensing electrodes, so as to obtain a complete fingerprint type detection result.

Figure 5:
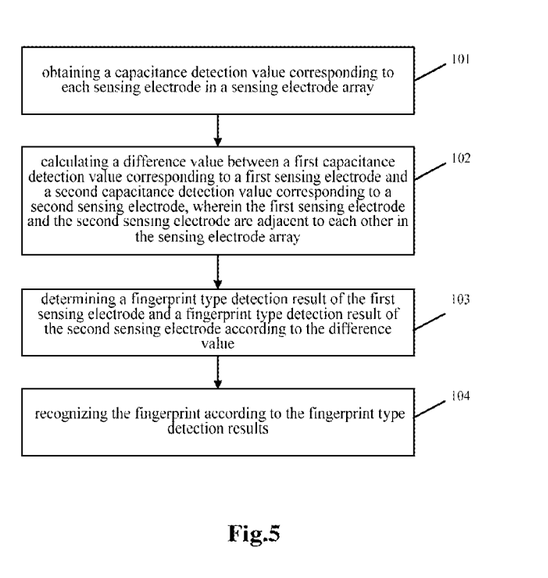
FIG. 5 is a flow chart showing a fingerprint recognition method in some embodiments of the present disclosure.

As shown in FIG. 5, the present disclosure provides in some embodiments a method for recognizing a fingerprint including: an obtaining step 101 of obtaining a capacitance detection value corresponding to each sensing electrode in a sensing electrode array; a calculation step 102 of calculating a difference value between a first capacitance detection value corresponding to a first sensing electrode and a second capacitance detection value corresponding to a second sensing electrode, wherein the first sensing electrode and the second sensing electrode are adjacent to each other in the sensing electrode array; a type determination step 103 of determining a fingerprint type detection result of the first sensing electrode and a fingerprint type detection result of the second sensing electrode according to the difference value; and a recognition step 104 of recognizing the fingerprint according to the fingerprint type detection results.

It should be noted that, in the embodiments of the present disclosure, the fingerprint recognition may refer to obtain a fingerprint of a user or refer to obtain the fingerprint of the user and perform a user verification by comparing the obtained fingerprint with a reference fingerprint.

In such methods, due to a fact that the measurement deviation affects each of the adjacent sensing electrodes in a same manner, the fingerprint type recognition corresponding to the adjacent sensing electrodes may be performed based on capacitance detection difference value of the adjacent sensing electrodes. As a result, an influence of the measurement deviation on the fingerprint type recognition is reduced, and an accuracy of the fingerprint recognition is improved.

It will be explained in detail as follows.

It is assumed that when the sensing electrode corresponds to the fingerprint valley, an actual capacitance value of the capacitor corresponding to the sensing electrode is $A+\Delta/4$, and when the sensing electrode corresponds to the fingerprint ridge, the actual capacitance value of the capacitor corresponding to the sensing electrode is $A+\Delta 3/4$. In addition, it is assumed that a measurement deviation is $\Delta/3$. As result, when the sensing electrode corresponds to the fingerprint valley and the fingerprint ridge, the capacitance detection values of the capacitors corresponding to the sensing electrode are $A+7\Delta/12$ $(A+\Delta/4+\Delta/3)$ and $A+13\Delta/12$ $(A+\Delta 3/4+\Delta/3)$.

According to the previously-mentioned type determination criteria, since the capacitance detection value $(A+7\Delta/12)$ of the fingerprint valley is greater than the type discrimination threshold $(A+\Delta/2)$, the fingerprint recognition result is the fingerprint ridge, and thus the fingerprint type recognition error occurs.

In contrast, according to the methods in some embodiments of the present disclosure, when the sensing electrodes correspond to the fingerprint valley and the fingerprint ridge, the difference value of the actual capacitance values of the capacitors corresponding to the sensing electrodes is $3\Delta/4$, while the difference value of the capacitance detection value is also $3\Delta/4$, which is not changed and affected by the measurement deviation. Therefore, based on this fact, the influence of the measurement deviation on the determination result may be reduced.

In recent years, electronic devices are being developed to be thinner and lighter. Therefore, in the embodiments of the present disclosure, as shown in FIG. 6, for reducing a thickness of the fingerprint sensor, the sensing electrodes in the sensing electrode array are arranged at the same plane, and the obtaining step comprises a step of: obtaining a capacitance detection value corresponding to a capacitor corresponding to each sensing electrode, wherein a first plate of the capacitor is formed by a sensing electrode currently to be detected in the sensing electrode array, and a second plate of the capacitor is formed by at least one sensing electrode adjacent to the sensing electrode currently to be detected in the sensing electrode array.

Figure 6:
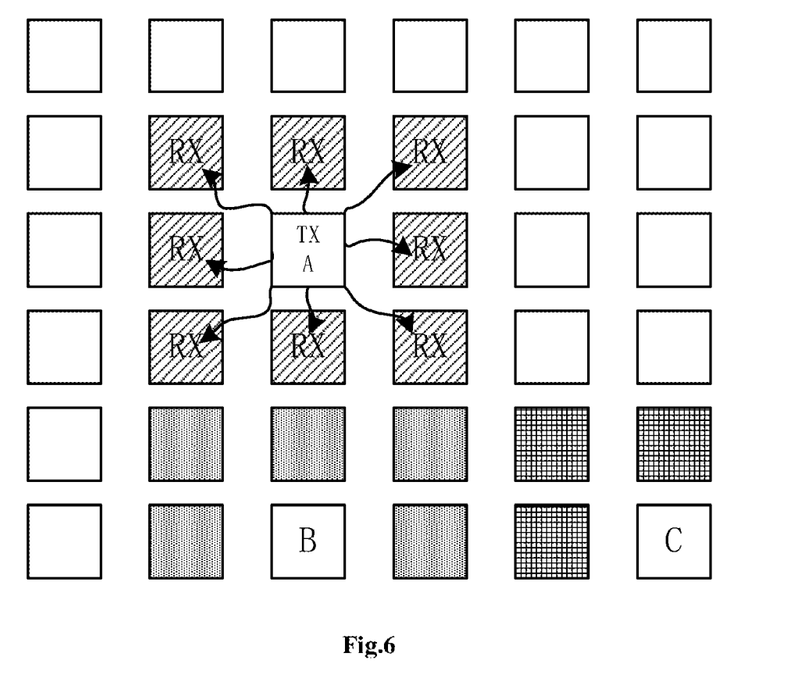
FIG. 6 is a schematic view showing a distribution of the sensing electrodes in a sensing electrode array in some embodiments of the present disclosure.

In the embodiments of the present disclosure, the sensing electrode array shown in FIG. 6 is of a square shape. Alternatively, the sensing electrode array can be of any other shape such as a diamond, or a circle, as long as an area of the array is larger than an area of the fingerprint part to be detected.

The shape of the sensing electrode in the sensing electrode array is not limited to the square. The smaller its size is, the higher the detection accuracy will be.

Therefore, a person skilled in the art can design the shape and the size of the sensing electrode and the sensing electrode array according to factors such as the detection environment and the actual requirements.

In the embodiments of the present disclosure, the first plate of the capacitor is formed by the sensing electrode currently to be detected in the sensing electrode array, and the second plate of the capacitor can be a sensing electrode adjacent to the sensing electrode currently to be detected or at least two sensing electrodes adjacent to the sensing electrode currently to be detected.

The smaller the actual capacitance value of the capacitor is, the greater the influence of being interfered will be. For example, for a capacitor with an actual capacitance value of A, the influence of the measurement deviation of A/100 on the final result is 1/100, whereas for a capacitor with an actual capacitance value of 100A, the influence of the measurement deviation of A/100 on the final result is 1/10000.

When a plurality of sensing electrodes adjacent to the sensing electrode currently to be detected is selected to form the capacitor with sensing electrode currently to be detected, the capacitor includes a plurality of capacitors that are connected in parallel and formed by the sensing electrode currently to be detected and each of the adjacent sensing electrodes. When the capacitors are connected in parallel, the capacity thereof is a sum of capacitance of the plurality of capacitors.

Therefore, in the embodiments of the present disclosure, for further reducing the influence of the measurement deviation on the capacitance detection value, the second plate is formed by all of the sensing electrodes adjacent to the sensing electrodes currently to be detected in the sensing electrode array.

As shown in FIG. 6, when the sensing electrode currently to be detected is A, the second plate includes eight sensing electrodes filled up with oblique lines in FIG. 6. When the sensing electrode currently to be detected is B, the second plate includes five sensing electrodes filled up with dots in FIG. 6. When the sensing electrode currently to be detected is C, the second plate includes three sensing electrodes filled up with grids in FIG. 6.

As mentioned previously, when it is determined that the fingerprint type detection results corresponding to the adjacent sensing electrodes are different according to the difference between the capacitance detection values corresponding to the adjacent sensing electrodes, the fingerprint type detection result of each sensing electrode in the adjacent sensing electrodes can be determined according to the types of the capacitor corresponding to the sensing electrode and the capacitance detection values corresponding to the adjacent sensing electrodes.

There are two types of capacitors, i.e. a mutual-capacitance capacitor and a self-capacitance capacitor. Hereafter, it is explained how to obtain the capacitance detection value in view of the mutual-capacitance capacitor and the self-capacitance capacitor respectively.

When the capacitor corresponding to the sensing electrode is a mutual capacitance capacitor, the obtaining step includes: a first transmission step of transmitting the excitation signal to the first plate, a first collection step of collecting the first electrical signal from the second plate during the process of transmitting the signal, and a first calculation step of calculating the capacitance detection value of the capacitor according to the first electrical signal.

Further explanation is given as follows with reference to FIG. 6.

It is assumed that the first plate is the sensing electrode A in FIG. 6, and the second plate is the eight sensing electrodes filled up with the oblique lines in FIG. 6.

At this time, firstly the excitation signal is transmitted to the sensing electrode A. During such process, signals are collected from the eight sensing electrodes filled up with the oblique lines, and the capacitance detection value of the capacitor is calculated according to the collected signals.

As for how to calculate the capacitance detection value according to the collected signals, it falls within the category of related art. Relevant contents are omitted here.

When the capacitor corresponding to the sensing electrode is the self-capacitance capacitor, the type determination step comprises steps of: determining that the fingerprint type detection result corresponding to the first sensing electrode is same as the fingerprint type detection result corresponding to the second sensing electrode in the case that an absolute value of the difference value is smaller than or equal to a capacitance difference threshold; determining that the fingerprint type detection result corresponding to the first sensing electrode is a fingerprint valley and the fingerprint type detection result corresponding to the second sensing electrode is a fingerprint ridge in the case that the absolute value of the difference value is greater than the capacitance difference threshold and the first capacitance detection value is greater than the second capacitance detection value; and determining that the fingerprint type detection result corresponding to the first sensing electrode is the fingerprint ridge and the fingerprint type detection result corresponding to the second sensing electrode is the fingerprint valley in the case that the absolute value of the difference value is greater than the capacitance difference threshold and the first capacitance detection value is smaller than the second capacitance detection value.

When the capacitor corresponding to the sensing electrode is the self-capacitance capacitor, the obtaining step includes: a second transmission step of transmitting the excitation signal and the ground signal to the first plate and the second plate respectively, a second collection step of collecting the second electrical signal from the first plate during the process of transmitting the signal, and a second calculation step of calculating the capacitance detection value of the capacitor according to the second electrical signal.

It should be understood that when the capacitor corresponding to the sensing electrode is the self-capacitance capacitor, the capacitance detection value not only includes the capacitance detection value of the capacitance structure formed by the sensing electrode and the second plate, but includes the capacitance detection value of the capacitance structure formed by the sensing electrode and the user's fingerprint as well.

Further explanation is given as follows with reference to FIG. 6.

It is assumed that the first plate is the sensing electrode A in FIG. 6, and the second plate is the eight sensing electrodes filled up with the oblique lines in FIG. 6.

At this time, firstly the excitation signal is transmitted to the sensing electrode A, and the ground signal (it also can be called a low level signal or a grounding signal) is transmitted to the eight sensing electrodes filled with the oblique lines. During the process of transmitting the signal to the sensing electrode, signals are collected from the sensing electrode A, and the capacitance detection value of the capacitor is calculated according to the collected signals.

As for how to calculate the capacitance detection value according to the collected signals, it falls within the category of related techniques. Relevant contents are omitted here.

When the capacitor corresponding to the sensing electrode is the mutual-capacitance capacitor, the type determination step comprises steps of: determining that the fingerprint type detection result corresponding to the first sensing electrode is same as the fingerprint type detection result corresponding to the second sensing electrode in the case that an absolute value of the difference value is smaller than or equal to a capacitance difference threshold; determining that the fingerprint type detection result corresponding to the first sensing electrode is a fingerprint ridge and the fingerprint type detection result corresponding to the second sensing electrode is a fingerprint valley in the case that the absolute value of the difference value is greater than the capacitance difference threshold and the first capacitance detection value is greater than the second capacitance detection value; and determining that the fingerprint type detection result corresponding to the first sensing electrode is the fingerprint valley and the fingerprint type detection result corresponding to the second sensing electrode is the fingerprint ridge in the case that the absolute value of the difference value is greater than the capacitance difference threshold and the first capacitance detection value is smaller than the second capacitance detection value.

In the embodiments of the present disclosure, when the second plate is at least two sensing electrodes adjacent to the sensing electrode currently to be detected, the capacitance detection value corresponding to the sensing electrode in the calculation step can be:

1. a capacitance detection value of a capacitor including capacitors that are connected in parallel and formed by the sensing electrode functioning as the first plate and at least two sensing electrodes adjacent to the first plate functioning as the second plate; or 2. a difference value between the capacitance detection value and capacitance initial value of the capacitor, wherein the capacitor includes capacitors that are connected in parallel and formed by the sensing electrode functioning as the first plate and at least two sensing electrodes adjacent to the first plate functioning as the second plate; or 3. an average of the capacitance detection values of a plurality of intermediate capacitors, each of which is formed by the sensing electrode functioning as the first plate and one of at least two sensing electrodes adjacent to the first plate; or 4. a root of mean square of the capacitance detection values of the plurality of intermediate capacitors, each of which is formed by the sensing electrode functioning as the first plate and one of at least two sensing electrodes adjacent to the first plate; or 5. another parameter obtained by carrying out a calculation on the capacitance detection values of the plurality of intermediate capacitors.

That is, in some embodiments of the present disclosure, the capacitance detection value corresponding to the sensing electrode not only includes the capacitance detection value of the capacitor formed by the sensing electrode, but includes the value obtained by carrying out a calculation on the capacitance detection values of the capacitors formed by the sensing electrode as well.

It should be understood that, the capacitance detection value corresponding to the above second type of sensing electrode eliminates the influence of the capacitance initial value, and thus during a subsequent process of calculating the difference value, it will more accurately reflect the capacitance difference of the adjacent sensing electrode under the impaction of the same electrical signal. As a result, the fingerprint type detection result corresponding to the first and second sensing electrodes respectively are more accurate, wherein the first and second sensing electrodes are adjacent to each other and obtained based on the capacitance difference.

In the embodiments of the present disclosure, a very important parameter is the capacitance difference threshold. It may be determined whether the fingerprint type detection results corresponding to the adjacent sensing electrodes are same or different based on the threshold. This threshold should meet the following requirements.

1. As shown in FIGS. 2 and 3, the threshold should be greater than both the absolute value of the difference between C11 and C12 and the absolute value of the difference between C21 and C22. Otherwise, it may mistakenly determine fingerprint units to be different that are actually the same.

2. As shown in FIG. 4, the threshold should be smaller than the absolute value of the difference between C31 and C32. Otherwise, it may mistakenly determine fingerprint units to be the same that are actually different.

In some embodiments of the present disclosure, the capacitance difference threshold can be determined in various manners, one of which is explained as follows.

Firstly, an accurate fingerprint of a testing user can be obtained in any possible manners, and the initial value of a capacitance difference threshold is set.

Next, according to the methods of the present disclosure, fingerprint recognition pattern of the testing user is obtained by means of the initial value of the capacitance difference threshold, and the fingerprint recognition pattern is compared with the accurate fingerprint, so as to determine whether they match each other. When they match each other, the initial value of the capacitance difference threshold can be used as a final capacitance difference threshold.

When they do not match each other, it is indicated that the fingerprint recognition pattern obtained by carrying out the fingerprint recognition with the initial value of the capacitance difference threshold is inaccurate. Therefore, the initial value of the capacitance difference threshold should be adjusted with a certain step length so as to obtain a new capacitance difference threshold.

Then, the fingerprint recognition pattern of the testing user is obtained again according to the new capacitance difference threshold, and the new fingerprint recognition pattern is compared with the real fingerprint to determine whether they match each other. When they match each other, the new capacitance difference threshold can be used as the final capacitance difference threshold. Otherwise, the capacitance difference threshold continues to be adjusted.

The above process may be repeated, until the accurate capacitance difference threshold used for the fingerprint recognition is finally obtained.

Figure 7:
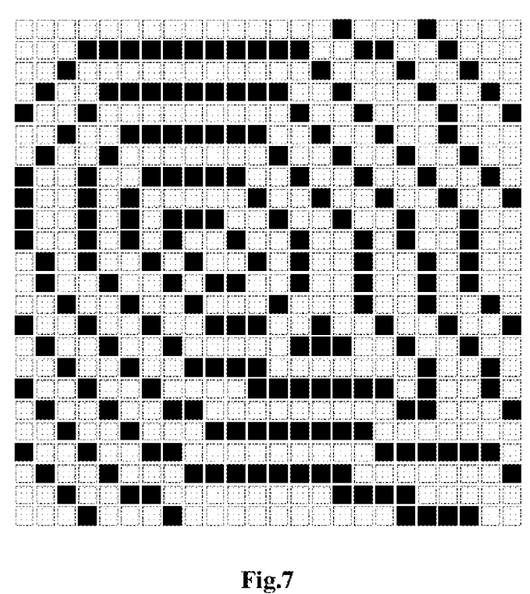
FIG. 7 is a schematic view showing a fingerprint type detection result of the sensing electrode array in some embodiments of the present disclosure.

In the embodiments of the present disclosure, after the fingerprint type detection results corresponding to all of the sensing electrodes are obtained, it is obtained a schematic view about the fingerprint type detection result of the whole sensing electrode array shown in FIG. 7.

Figure 8:
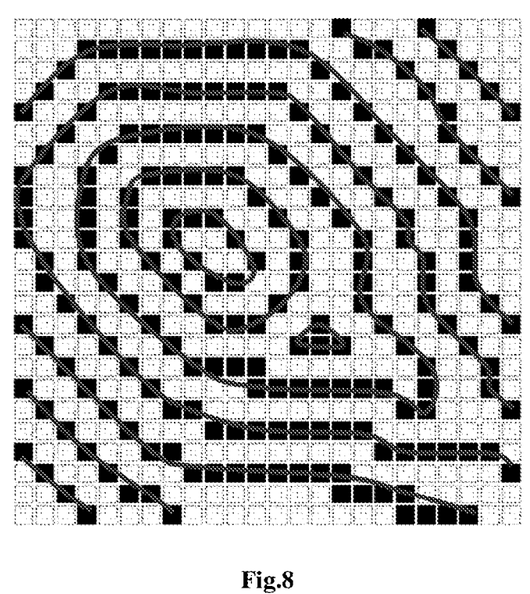
FIG. 8 relates to a schematic view about a fingerprint ridge and a fingerprint valley that are differentiated by patterns in some embodiments of the present disclosure.
Figure 9:
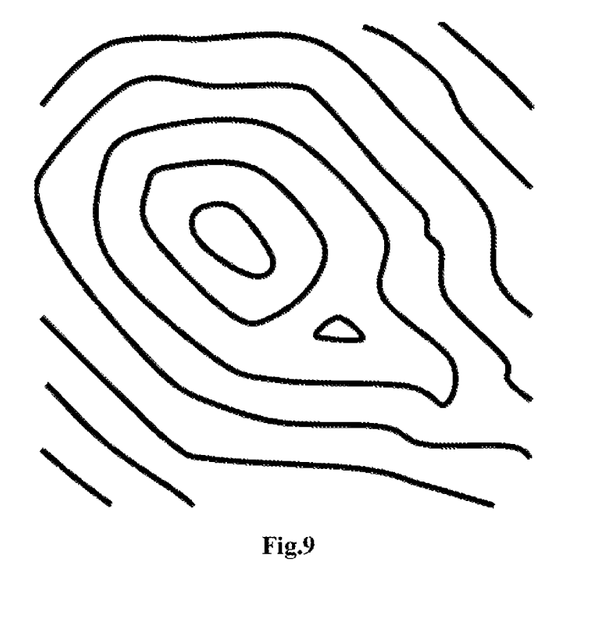
FIG. 9 is a schematic view showing a recognized fingerprint in some embodiments of the present disclosure.

As shown in FIG. 8, after the fingerprint type detection result of the whole sensing electrode array shown in FIG. 7 is obtained, the fingerprint ridge and the fingerprint valley are recognized based on the patterns. As a result, the fingerprint may be finally obtained as shown in FIG. 9.

Figure 10:
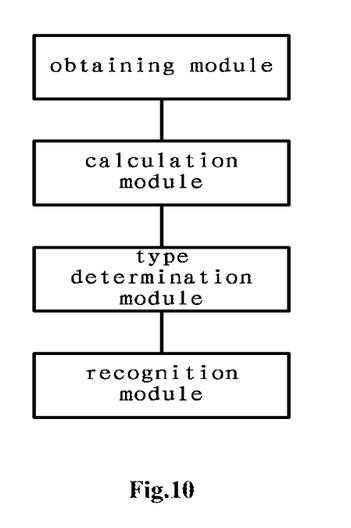
FIG. 10 is a schematic view showing a fingerprint recognition device in some embodiments of the present disclosure.

As shown in FIG. 10, the present disclosure further provides in some embodiments a fingerprint recognition device, comprising: an obtaining module configured for obtaining a capacitance detection value corresponding to each sensing electrode in a sensing electrode array; a calculation module configured for calculating a difference value between a first capacitance detection value corresponding to a first sensing electrode and a second capacitance detection value corresponding to a second sensing electrode, wherein the first sensing electrode and the second sensing electrode are adjacent to each other in the sensing electrode array; a type determination module configured for determining a fingerprint type detection result of the first sensing electrode and a fingerprint type detection result of the second sensing electrode according to the difference value; and a recognition module configured for recognizing the fingerprint according to the fingerprint type detection results.

In the above fingerprint recognition device, the obtaining module is further configured for obtaining a capacitance detection value corresponding to a capacitor corresponding to each sensing electrode, wherein a first plate of the capacitor is formed by a sensing electrode currently to be detected in the sensing electrode array, and a second plate of the capacitor is formed by at least one sensing electrode adjacent to the sensing electrode currently to be detected in the sensing electrode array.

In the above fingerprint recognition device, the obtaining module comprises: a first transmission unit configured for transmitting an excitation signal to the first plate; a first collection unit configured for collecting a first electrical signal from the second plate during the transmission of the excitation signal; and a first calculation unit configured for calculating the capacitance detection value of the capacitor according to the first electrical signal.

In the above fingerprint recognition device, the type determination module is further configured for: determining that the fingerprint type detection result corresponding to the first sensing electrode is same as the fingerprint type detection result corresponding to the second sensing electrode in the case that an absolute value of the difference value is smaller than or equal to a capacitance difference threshold; determining that the fingerprint type detection result corresponding to the first sensing electrode is a fingerprint valley and the fingerprint type detection result corresponding to the second sensing electrode is a fingerprint ridge in the case that the absolute value of the difference value is greater than the capacitance difference threshold and the first capacitance detection value is greater than the second capacitance detection value; and determining that the fingerprint type detection result corresponding to the first sensing electrode is the fingerprint ridge and the fingerprint type detection result corresponding to the second sensing electrode is the fingerprint valley in the case that the absolute value of the difference value is greater than the capacitance difference threshold and the first capacitance detection value is smaller than the second capacitance detection value.

In the above fingerprint recognition device, the obtaining module comprises: a second transmission unit configured for transmitting an excitation signal and a ground signal to the first plate and the second plate respectively; a second collection unit configured for collecting a second electrical signal from the first plate during the transmission of the signals; and a second calculation unit configured for calculating the capacitance detection value of the capacitor according to the second electrical signal.

In the above fingerprint recognition device, the type determination module is further configured for: determining that the fingerprint type detection result corresponding to the first sensing electrode is same as the fingerprint type detection result corresponding to the second sensing electrode in the case that an absolute value of the difference value is smaller than or equal to a capacitance difference threshold; determining that the fingerprint type detection result corresponding to the first sensing electrode is a fingerprint ridge and the fingerprint type detection result corresponding to the second sensing electrode is a fingerprint valley in the case that the absolute value of the difference value is greater than the capacitance difference threshold and the first capacitance detection value is greater than the second capacitance detection value; and determining that the fingerprint type detection result corresponding to the first sensing electrode is the fingerprint valley and the fingerprint type detection result corresponding to the second sensing electrode is the fingerprint ridge in the case that the absolute value of the difference value is greater than the capacitance difference threshold and the first capacitance detection value is smaller than the second capacitance detection value.

The present disclosure further provides in some embodiments an electronic device, which includes the above fingerprint recognition device.

In some embodiments of the present disclosure, the module may be realized by software so that they can be performed by various types of processors. For example, an identified executable code module may include one or more physical or logical blocks of a computer instruction. For instance, it can be constructed into an object, a process or a function. Even so, the executable code of the identified module may include different instructions stored in different positions without being physically located together. When the instructions are combined together logically, they may form the module and achieve the object defined by the module.

Actually, the executable code module can be a single instruction or many instructions, and even they are distributed on a plurality of different code segments or in different programs, and are distributed in a manner of crossing a plurality of memory devices. Likewise, the operation data can be identified inside the modules, can be realized in accordance with any suitable manner, and can be organized in the data structure of any suitable type. The operation data may be collected as a single data set, or can be distributed on different positions (the data can be stored on different memory devices), and can at least partly serve as electronic signals so as to be stored in a system or in the network.

When the module is realized by the hardware, in consideration of the level of the prior hardware manufacturing process and regardless of expense, a person skilled in the art can build the hardware circuit to realize the function corresponding to the module that can be realized by the software. The hardware circuit includes conventional super-large-scale integration (VLSI) circuit or gate arrays and components of the conventional semiconductors such as the logic chip and the transistor or other discrete components. The modules also can be realized by programmable hardware devices such as a field-programmable gate array, a programmable array logic and a programmable logic device.

The above are merely the optional embodiments of the present disclosure and shall not be used to limit the scope of the present disclosure. Any further improvements, substitutes and modifications made without departing from the spirit and principle of the present disclosure shall also fall within the scope of the present disclosure.

What is claimed is:

1. A method for recognizing a fingerprint, comprising:
   an obtaining step of obtaining a capacitance detection value corresponding to each sensing electrode in a sensing electrode array;
   a calculation step of calculating a difference value between a first capacitance detection value corresponding to a first sensing electrode and a second capacitance detection value corresponding to a second sensing electrode, wherein the first sensing electrode and the second sensing electrode are adjacent to each other in the sensing electrode array;
   a type determination step of determining a fingerprint type detection result of the first sensing electrode and a fingerprint type detection result of the second sensing electrode according to the difference value; and
   a recognition step of recognizing the fingerprint according to the fingerprint type detection results.

2. The method according to claim 1, wherein
   sensing electrodes in the sensing electrode array are arranged on a same plane; and
   the obtaining step comprises a step of: obtaining a capacitance detection value corresponding to a capacitor corresponding to each sensing electrode, wherein a first plate of the capacitor is formed by a sensing electrode currently to be detected in the sensing electrode array, and a second plate of the capacitor is formed by at least one sensing electrode adjacent to the sensing electrode currently to be detected in the sensing electrode array.

3. The method according to claim 2, wherein the obtaining step comprises:
   a transmission step of transmitting an excitation signal to the first plate;
   a collection step of collecting a first electrical signal from the second plate during the transmission of the excitation signal; and
   a calculation step of calculating the capacitance detection value of the capacitor according to the first electrical signal.

4. The method according to claim 1, wherein the type determination step comprises steps of:
   determining that the fingerprint type detection result corresponding to the first sensing electrode is same as the fingerprint type detection result corresponding to the second sensing electrode in the case that an absolute value of the difference value is smaller than or equal to a capacitance difference threshold;
   determining that the fingerprint type detection result corresponding to the first sensing electrode is a fingerprint valley and the fingerprint type detection result corresponding to the second sensing electrode is a fingerprint ridge in the case that the absolute value of the difference value is greater than the capacitance difference threshold and the first capacitance detection value is greater than the second capacitance detection value; and
   determining that the fingerprint type detection result corresponding to the first sensing electrode is the fingerprint ridge and the fingerprint type detection result corresponding to the second sensing electrode is the fingerprint valley in the case that the absolute value of the difference value is greater than the capacitance difference threshold and the first capacitance detection value is smaller than the second capacitance detection value.

5. The method according to claim 2, wherein the obtaining step comprises:
   a transmission step of transmitting an excitation signal and a ground signal to the first plate and the second plate respectively;
   a collection step of collecting a second electrical signal from the first plate during the transmission of the signals; and
   a calculation step of calculating the capacitance detection value of the capacitor according to the second electrical signal.

6. The method according to claim 1, wherein the type determination step comprises steps of:
   determining that the fingerprint type detection result corresponding to the first sensing electrode is same as the fingerprint type detection result corresponding to the second sensing electrode in the case that an absolute value of the difference value is smaller than or equal to a capacitance difference threshold;
   determining that the fingerprint type detection result corresponding to the first sensing electrode is a fingerprint ridge and the fingerprint type detection result corresponding to the second sensing electrode is a fingerprint valley in the case that the absolute value of the difference value is greater than the capacitance difference threshold and the first capacitance detection value is greater than the second capacitance detection value; and
   determining that the fingerprint type detection result corresponding to the first sensing electrode is the fingerprint valley and the fingerprint type detection result corresponding to the second sensing electrode is the fingerprint ridge in the case that the absolute value of the difference value is greater than the capacitance difference threshold and the first capacitance detection value is smaller than the second capacitance detection value.

7. The method according to claim 2, wherein the second plate is formed by all of the sensing electrodes adjacent to the sensing electrode currently to be detected in the sensing electrode array.

8. The method according to claim 3, wherein a type of the capacitor corresponding to the sensing electrode is a mutual-capacitance capacitor.

9. The method according to claim 4, wherein a type of the capacitor corresponding to the sensing electrode is a self-capacitance capacitor.

10. A fingerprint recognition device, comprising:
    an obtaining module configured for obtaining a capacitance detection value corresponding to each sensing electrode in a sensing electrode array;
    a calculation module configured for calculating a difference value between a first capacitance detection value corresponding to a first sensing electrode and a second capacitance detection value corresponding to a second sensing electrode, wherein the first sensing electrode and the second sensing electrode are adjacent to each other in the sensing electrode array;

a type determination module configured for determining a fingerprint type detection result of the first sensing electrode and a fingerprint type detection result of the second sensing electrode according to the difference value; and a recognition module configured for recognizing the fingerprint according to the fingerprint type detection results.

11. The fingerprint recognition device according to claim 10, wherein the obtaining module is further configured for obtaining a capacitance detection value corresponding to a capacitor corresponding to each sensing electrode, wherein a first plate of the capacitor is formed by a sensing electrode currently to be detected in the sensing electrode array, and a second plate of the capacitor is formed by at least one sensing electrode adjacent to the sensing electrode currently to be detected in the sensing electrode array.

12. The fingerprint recognition device according to claim 11, wherein the obtaining module comprises:

a transmission unit configured for transmitting an excitation signal to the first plate;

a collection unit configured for collecting a first electrical signal from the second plate during the transmission of the excitation signal; and a calculation unit configured for calculating the capacitance detection value of the capacitor according to the first electrical signal.

13. The fingerprint recognition device according to claim 10, wherein the type determination module is further configured for:

determining that the fingerprint type detection result corresponding to the first sensing electrode is same as the fingerprint type detection result corresponding to the second sensing electrode in the case that an absolute value of the difference value is smaller than or equal to a capacitance difference threshold;

determining that the fingerprint type detection result corresponding to the first sensing electrode is a fingerprint valley and the fingerprint type detection result corresponding to the second sensing electrode is a fingerprint ridge in the case that the absolute value of the difference value is greater than the capacitance difference threshold and the first capacitance detection value is greater than the second capacitance detection value; and determining that the fingerprint type detection result corresponding to the first sensing electrode is the fingerprint ridge and the fingerprint type detection result corresponding to the second sensing electrode is the fingerprint valley in the case that the absolute value of the difference value is greater than the capacitance difference threshold and the first capacitance detection value is smaller than the second capacitance detection value.

14. The fingerprint recognition device according to claim 11, wherein the obtaining module comprises:

a transmission unit configured for transmitting an excitation signal and a ground signal to the first plate and the second plate respectively;

a collection unit configured for collecting a second electrical signal from the first plate during the transmission of the signals; and a calculation unit configured for calculating the capacitance detection value of the capacitor according to the second electrical signal.

15. The fingerprint recognition device according to claim 10, wherein the type determination module is further configured for:

determining that the fingerprint type detection result corresponding to the first sensing electrode is same as the fingerprint type detection result corresponding to the second sensing electrode in the case that an absolute value of the difference value is smaller than or equal to a capacitance difference threshold;

determining that the fingerprint type detection result corresponding to the first sensing electrode is a fingerprint ridge and the fingerprint type detection result corresponding to the second sensing electrode is a fingerprint valley in the case that the absolute value of the difference value is greater than the capacitance difference threshold and the first capacitance detection value is greater than the second capacitance detection value; and determining that the fingerprint type detection result corresponding to the first sensing electrode is the fingerprint valley and the fingerprint type detection result corresponding to the second sensing electrode is the fingerprint ridge in the case that the absolute value of the difference value is greater than the capacitance difference threshold and the first capacitance detection value is smaller than the second capacitance detection value.

16. The fingerprint recognition device according to claim 11, wherein the second plate is formed by all of the sensing electrodes adjacent to the sensing electrode currently to be detected in the sensing electrode array.

17. The fingerprint recognition device according to claim 12, wherein a type of the capacitor corresponding to the sensing electrode is a mutual-capacitance capacitor.

18. The fingerprint recognition device according to claim 13, wherein a type of the capacitor corresponding to the sensing electrode is a self-capacitance capacitor.

19. An electronic device, comprising a fingerprint recognition device according to claim 10.

20. The electronic device according to claim 19, wherein the obtaining module is further configured for obtaining a capacitance detection value corresponding to a capacitor corresponding to each sensing electrode, wherein a first plate of the capacitor is formed by a sensing electrode currently to be detected in the sensing electrode array, and a second plate of the capacitor is formed by at least one sensing electrode adjacent to the sensing electrode currently to be detected in the sensing electrode array.

* * * * *